(12) United States Patent
Yoshida

(10) Patent No.: US 8,060,702 B2
(45) Date of Patent: Nov. 15, 2011

(54) INFORMATION REPRODUCING APPARATUS AND INFORMATION REPRODUCING METHOD

(75) Inventor: Hitoshi Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

(21) Appl. No.: 12/125,376

(22) Filed: May 22, 2008

(65) Prior Publication Data

US 2008/0294865 A1 Nov. 27, 2008

(30) Foreign Application Priority Data

May 25, 2007 (JP) ................................ 2007-139591

(51) Int. Cl.
*G06F 12/00* (2006.01)

(52) U.S. Cl. ................ 711/138; 711/154; 711/E12.021; 710/38

(58) Field of Classification Search ........................ None
See application file for complete search history.

(56) References Cited

U.S. PATENT DOCUMENTS

| | | | | |
|---|---|---|---|---|
| 5,958,040 | A * | 9/1999 | Jouppi | 712/207 |
| 2003/0105926 | A1* | 6/2003 | Rodriguez | 711/129 |
| 2005/0066063 | A1* | 3/2005 | Grigorovitch et al. | 710/1 |

FOREIGN PATENT DOCUMENTS

| | | |
|---|---|---|
| JP | 06-110774 | 4/1994 |
| JP | 06-214839 | 8/1994 |
| JP | 10-261075 | 9/1998 |
| JP | 2000-181785 | 6/2000 |
| JP | 2002-268924 | 9/2002 |
| JP | 2005-141335 | 6/2005 |

OTHER PUBLICATIONS

Japanese Office Action dated Jul. 5, 2011.

* cited by examiner

*Primary Examiner* — Reginald Bragdon
*Assistant Examiner* — Baboucarr Faal
(74) *Attorney, Agent, or Firm* — Pillsbury Winthrop Shaw Pittman, LLP

(57) ABSTRACT

According to one embodiment, an information reproducing apparatus includes a memory, a decoder, an intermediate memory which is disposed between the memory and the decoder and which temporarily stores, in succession, the data that are supplied from the memory and then outputs the data to the decoder, switching circuit for switching an output of the memory to one of the decoder and the intermediate memory, memory management circuit for managing arrangement information of the data that are stored in the memory, determination circuit for determining whether the data that are stored in the memory are arranged in physically discontinuous memory areas of the memory, and switching control circuit for switching, in a case where the determination circuit determines that the data are arranged in the physically divided memory areas, the switching circuit in a manner to input the data output from the memory to the decoder via the intermediate memory.

8 Claims, 4 Drawing Sheets

Secured for each resource data

INFORMATION REPRODUCING APPARATUS AND INFORMATION REPRODUCING METHOD

CROSS-REFERENCE TO RELATED APPLICATIONS

This application is based upon and claims the benefit of priority from Japanese Patent Application No. 2007-139591, filed May 25, 2007, the entire contents of which are incorporated herein by reference.

BACKGROUND

1. Field

One embodiment of the present invention relates to an information reproducing apparatus, for example, an information reproducing apparatus including a plurality of memory areas, and an information reproducing method for use in the information reproducing apparatus.

2. Description of the Related Art

Conventionally, an information reproducing apparatus includes a memory which stores resource data that is input from outside. When resource data is stored in the memory, a capacity necessary for storing the resource data is secured.

In general, when resource data is decoded, it is preferable that the data be arranged in continuous areas in the memory. Although depending on restrictions by a resource decoder, it is preferable, in general, that the resource decoder handle, as input data, data which are arranged in areas that are physically continuous to some degree in accordance with the kind (format) of input resource data.

Thus, all input data should optimally be arranged in the continuous areas. This tendency is more conspicuous in a case where the resource decoder is configured by hardware, than in a case where the resource decoder is configured by software.

There has been proposed a conventional technique wherein while each of a plurality of divisional unit memories, each being composed of a block of a predetermined capacity, is being used, continuous memory areas can easily be secured by a memory management method which manages an empty state of each unit memory (see Jpn. Pat. Appln. KOKAI Publication No. 2000-181785).

However, even if the memory is managed in the above-described manner, there has been a case in which the resource data that is stored in the memory is not arranged in a manner which is intended by the resource decoder. In a case where data are not arranged in continuous areas of the memory, an excess overhead of a data transfer process or an excess overhead of decoder control occurs, leading to a decrease in performance of the entire system.

For example, in a case where it is assumed that JPEG images are used as resource data and some of the JPEG images are arranged and displayed on a single screen, the time needed from the beginning to the end of the display process is shorter as the speed of the decoding process is higher, and the user regards the system as being preferable with good responsivity.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information reproducing apparatus comprising: a memory which includes a plurality of memory areas in which input data are stored; a decoder which decodes the data; an intermediate memory which is disposed between the memory and the decoder and which temporarily stores, in succession, the data that are supplied from the memory and then outputs the data to the decoder; switching means for switching an output of the memory to one of the decoder and the intermediate memory; memory management means for managing arrangement information of the data that are stored in the plurality of memory areas; determination means for determining whether the data that are stored in the memory are arranged in continuous memory areas of the memory; and switching control means for switching, in a case where the determination means determines that the data are arranged in physically divided memory areas of the plurality of memory areas, the switching means in a manner to input the data output from the memory to the decoder via the intermediate memory, and switching, in a case where the determination means determines that the data are arranged in the continuous areas of the memory, the switching means in a manner to input the data output from the memory to the decoder.

Figure 1:
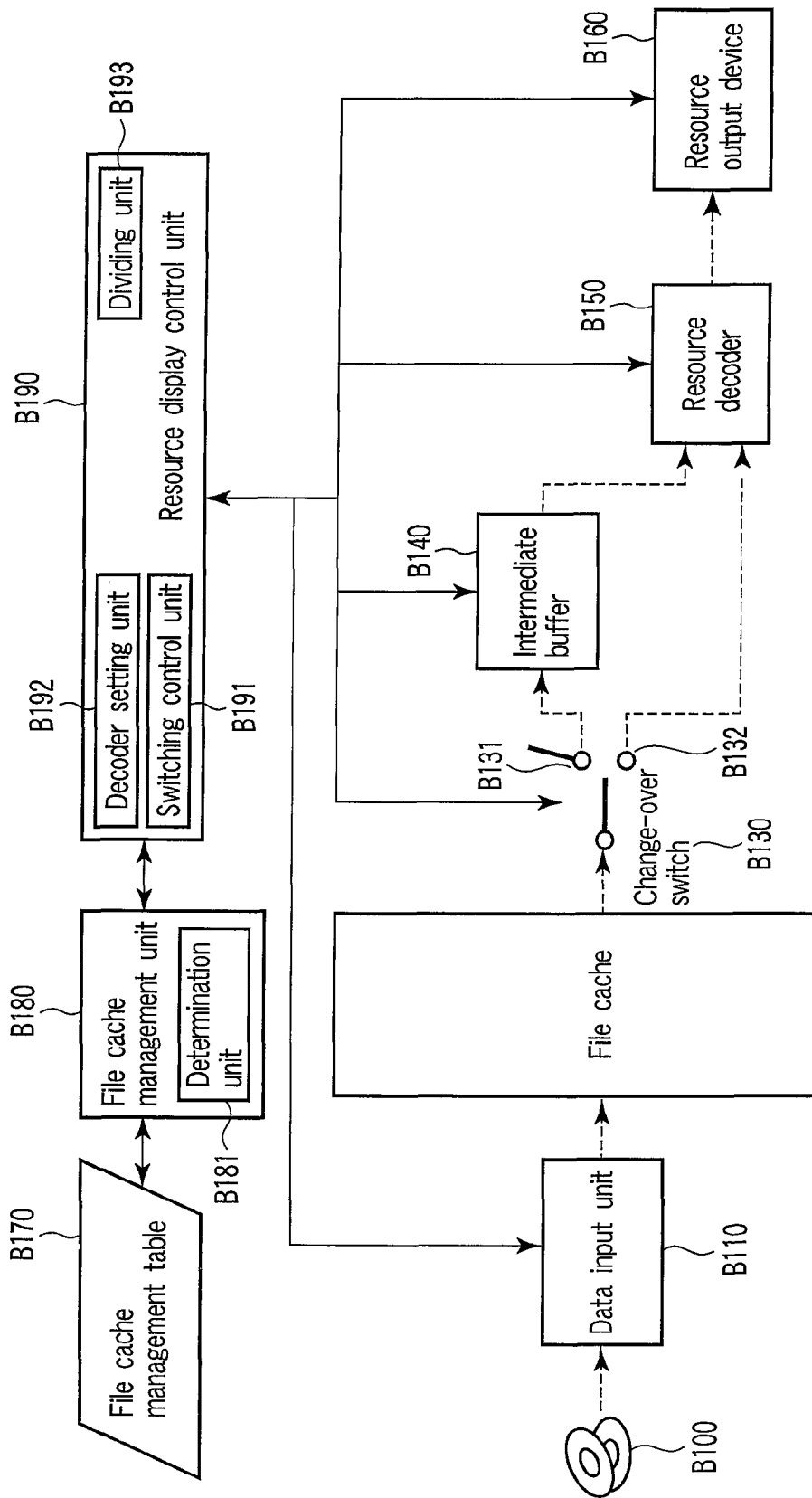
FIG. 1 schematically shows an example of the structure of an information reproducing apparatus according to an embodiment of the invention.

As is shown in FIG. 1, an information reproducing apparatus according to an embodiment of the invention includes a data input unit B110 to which resource data that is to be reproduced is input; a file cache B120 which temporarily stores the resource data that is input from the data input unit B110; a file cache management unit B180 which manages the file cache B120, and a resource display control unit B190 functioning as a control unit which executes, e.g. a decode instruction of a module that is to be output.

The data input unit B110 is controlled by the resource display control unit B190, acquires resource data, which is to be reproduced, from a disc B100, an external memory, a network, etc., and inputs the acquired resource data to the file cache B120.

The file cache B120 is a memory area which stores resource data that is input from the data input unit B110. The file cache B120 includes a plurality of continuous memory areas. For example, in a case where the capacity of the file cache B120 is 3 MB, if resource data having a size of 3 MB is input, three resource data D1, D2 and D3, each having a size of 1 MB, are arranged in three continuous memory areas, as indicated by arrangement A1 in FIG. 5.

A change-over switch B130 is connected to an output terminal of the file cache B120. The change-over switch B130 has an input terminal to which the resource data, which is supplied from the file cache B120, is input; an output terminal B131 which is connected to an output line to an intermediate buffer B140; and an output terminal B132 which is connected to an output line to a resource decoder B150.

Accordingly, if the output terminal of the file cache B120 is connected to the output terminal B131 by the change-over switch B130, the resource data, which is output from the file cache B120, is supplied to the intermediate buffer B140. If the output terminal of the file cache B120 is connected to the output terminal B132 by the change-over switch B130, the resource data, which is output from the file cache B120, is supplied to the resource decoder B150.

The resource data that is output from the intermediate buffer B140 is supplied to the resource decoder B150. The resource decoder B150 is a decode module which decodes the resource data that is arranged in the file cache B120, and the operation of the resource decoder B150 is controlled by the resource display control unit B190.

A resource output device B160 is a device which outputs data that is decoded by the resource decoder B150, and the operation of the resource output device B160 is controlled by the resource display control unit B190. For example, in a case where input data is video data, the resource output device B160 outputs the video data to a display device. In a case where input data is audio data, the resource output device B160 outputs the audio data to a speaker.

The file cache management unit B180 is a module which manages and controls data in the file cache B120 by using a file cache management table B170. The file cache management table B170 is a table for managing arrangement information of the resource data that is stored in the file cache B120.

Figure 2:
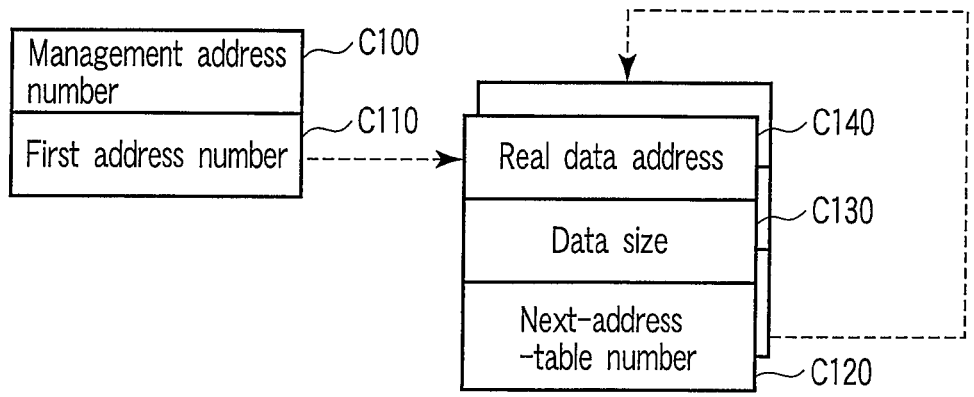
FIG. 2 is an exemplary view for explaining an example of the structure of a file cache management table of the information reproducing apparatus in the embodiment.

In the file cache management table B170, a management address number C100 and a first address C110 are set in association with each of resource data that are stored in the file cache B120, for example, as shown in FIG. 2. The management address number C100 indicates arrangement information of physically continuous individual data blocks of a real data address C140 on the basis of a next-address-table number C120.

Figure 5:
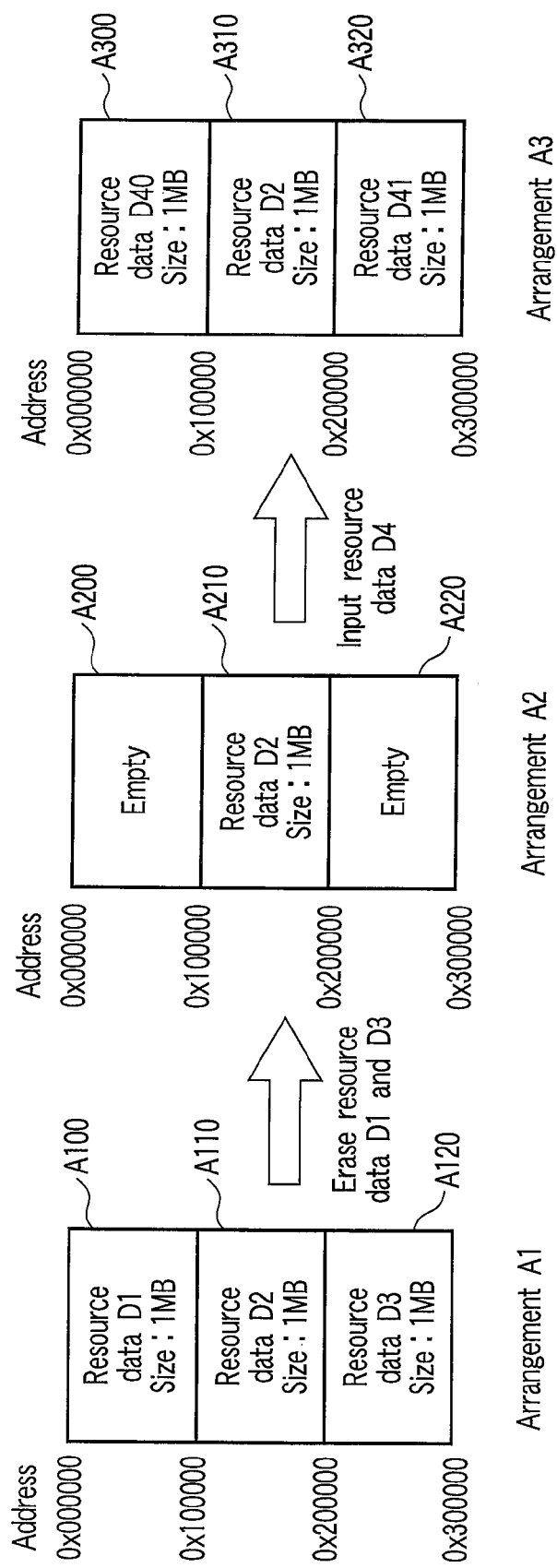
FIG. 5 is an exemplary view for explaining an example of arrangement of resource data in a file cache in the information reproducing apparatus in the embodiment.

Accordingly, for example, in a case where resource data are arranged in a single set of continuous areas in the file cache B120, as indicated by arrangement Al in FIG. 5, the management address number C100 is 1.

For example, in a case where resource data, like resource data D40 and D41 in arrangement A3 in FIG. 5, are arranged in a plurality of physically divided discontinuous areas in the file cache B120, the management address number C100 is the number of the divided areas. Since the resource data D40 and D41 in the arrangement A3 in FIG. 5 are arranged in two physically divided discontinuous areas, the management address number C100 is 2.

An address that is set in the first address C110 indicates a first address of a memory area in which the real data address C140 is stored. For example, in the case of the resource data D40 in the arrangement A3 in FIG. 5, the first address is 0×000000.

A memory area next to the area, in which the read data address C140 is stored, stores a data size C130. For example, in the case of resource data D40 and D41 in the arrangement A3 in FIG. 5, the data size C130 of each of the resource data D40 and D41 is 1 MB.

Further, a memory area next to the data size C130 stores a next-address-table number C120. For example, in the case of the resource data D40 in the arrangement A3 in FIG. 5, the next-address-table number C120 is 0×300000.

In the case of the resource data D41 in the arrangement A3 in FIG. 5, the resource data D41 is completed in the two physically divided discontinuous areas. Thus, the next-address-table number C120 of the next set is a value (e.g. 0×FFFFFFFF) which indicates that the data ends in this table. With the provision of this management table, the resource data management of the file cache B120 in the information reproducing apparatus according to the present embodiment can be performed.

The file cache management unit B180 includes a determination unit B181 which determines whether the data stored in the file cache B120 is arranged in a plurality of physically continuous areas or not. The resource display control unit B190 inquires of the determination unit B181 as to whether the resource data, which are arranged in the file cache B120, are written in continuous areas or in discontinuous areas.

The determination unit B181 of the file cache management unit B180 determines whether the resource data are stored in continuous areas or in discontinuous areas, on the basis of the arrangement information of data in the file cache management table B170, and reports the determination information to the resource display control unit B190. In an example of the determination by the determination unit B180, the determination unit B180 determines that the resource data are stored in continuous areas if the management address number C100 in the file cache management table B170 is 1, and determines that the resource data are stored in discontinuous areas if the management address number C100 in the file cache management table B170 is 2 or more.

The resource display control unit B190 includes a switching control unit B191 which controls the change-over switch B130 in accordance with the information that is reported from the determination unit B181 of the file cache management unit B180; a decoder setting unit B192 which performs process setting of the resource decoder B150 when the path from the file cache B120 to the resource decoder B150 is switched by the change-over switch B130; and a dividing unit B193 which further divides the data that is transferred from the file cache B120 to the intermediate buffer B140, in a case where there are restrictions by the resource decoder B150 or by the resource data.

When the switching control unit B191 receives from the determination unit B181 of the file cache management unit B180 the information that the resource data are arranged in physically divided discontinuous areas, the switching control unit B191 switches the path of the change-over switch B130 to the output terminal B131 side. On the other hand, when the switching control unit B191 receives from the determination unit B181 the information that the resource data are arranged in continuous areas, the switching control unit B191 switches the path of the change-over switch B130 to the output terminal B132 side.

In a case where the resource decoder B150 includes a plurality of kinds of decoders, such as a JPEG decoder and an audio decoder, the method of processing resource data, which are arranged in the file cache B120, varies depending on the kind of the resource data that is to be decoded.

Thus, for example, in the case where the decoder for executing a decoding process is a decoder that is unable to execute a decoding process unless resource data that are to be decoded are arranged in continuous areas, and in the case where the resource data are arranged discontinuously in the file cache B120, the decoder setting unit B192 connects the change-over switch B130 to the output terminal B131 side, transfers the data to the intermediate buffer B140, ensures that the data is physically continuous, and sets the resource decoder B150 in a continuous decoding setting.

In the case where the decoder for executing a decoding process is a decoder that is able to execute a decoding process even if resource data that are to be decoded are arranged in discontinuous areas, and in the case where the resource data are arranged discontinuously in the file cache B120, the decoder setting unit B192 connects the change-over switch B130 to the output terminal B132 side, and sets the resource decoder B150 in a divisional decoding setting.

Next, the operation of the above-described information reproducing apparatus is described. A description is given of the case in which input data, which is data from the disc B100, is reproduced. The resource display control unit B190 requests the file cache management unit B180 to secure a memory that is necessary in order to arrange resource data, which is to be reproduced, in the file cache B120.

On the basis of the file cache management table B170, the file cache management unit B180 determines whether a memory area of a necessary size can be secured or not, and executes computation as to what arrangement of data is available for securing the memory area. The file cache management unit B180 reports the determination result and computation result to the resource display control unit B190.

In the case where the necessary memory area is successfully secured, the resource display control unit B190 instructs the data input unit B110 to arrange resource data in the secured memory area of the file cache B120.

If the data are arranged in the file cache B120, the data input unit B110 informs the resource display control unit B190 of the completion of data arrangement. The resource display control unit B190 inquires of the file cache management unit B180 as to whether the arranged data are written in continuous memory areas or in discontinuous memory areas.

For example, in a case where resource data with a total size of 3 MB, which comprises three resource data (D1, D2 and D3) each having a size of 1 MB, have been input to the data input unit B110, the resource data D1, D2 and D3 each having a size of 1 MB are loaded from the data input unit B110 into the file cache B120.

At this time, for example, in the case where the capacity of the file cache B120 is 3 MB, the resource data are arranged in the physically continuous areas, as shown in the arrangement A1 in FIG. 5. Specifically, the resource data D1 is disposed in an area A100, the resource data D2 is disposed in an area A110 which neighbors the area A100, and the resource data D3 is disposed in an area A120 which neighbors the area A110.

If the resource data D1 and resource data D3 in the state of the arrangement A1 in FIG. 5 are erased from the file cache B120, the resource data D2 alone is disposed in an area A210 in the file cache B120, as in the state of arrangement A2 in FIG. 5.

Further, if new resource data D4 of a size of 2 MB is loaded in the file cache B120 in the state of arrangement A2 in FIG. 5, resource data D40 and D41 are arranged in empty areas A200 and A220 in the arrangement A2 in FIG. 5, and the resource data are arranged in a state of arrangement A3 in FIG. 5.

Specifically, as in the state of arrangement A3 in FIG. 5, there occurs a case in which logically single resource data is arranged in physically discontinuous areas A300 and A320.

The determination unit B181 of the file cache management unit B180 determines whether the resource data are continuously arranged or discontinuously arranged, on the basis of the data arrangement information C100 in the file cache management table B170, and reports the determination information to the resource display control unit B190. For example, if the management address number of arrangement information C100 is 1, the file cache management unit B180 determines that the resource data are continuously arranged. If the management address number of arrangement information C100 is 2 or more, the file cache management unit B180 determines that the resource data are discontinuously arranged.

Figure 4:
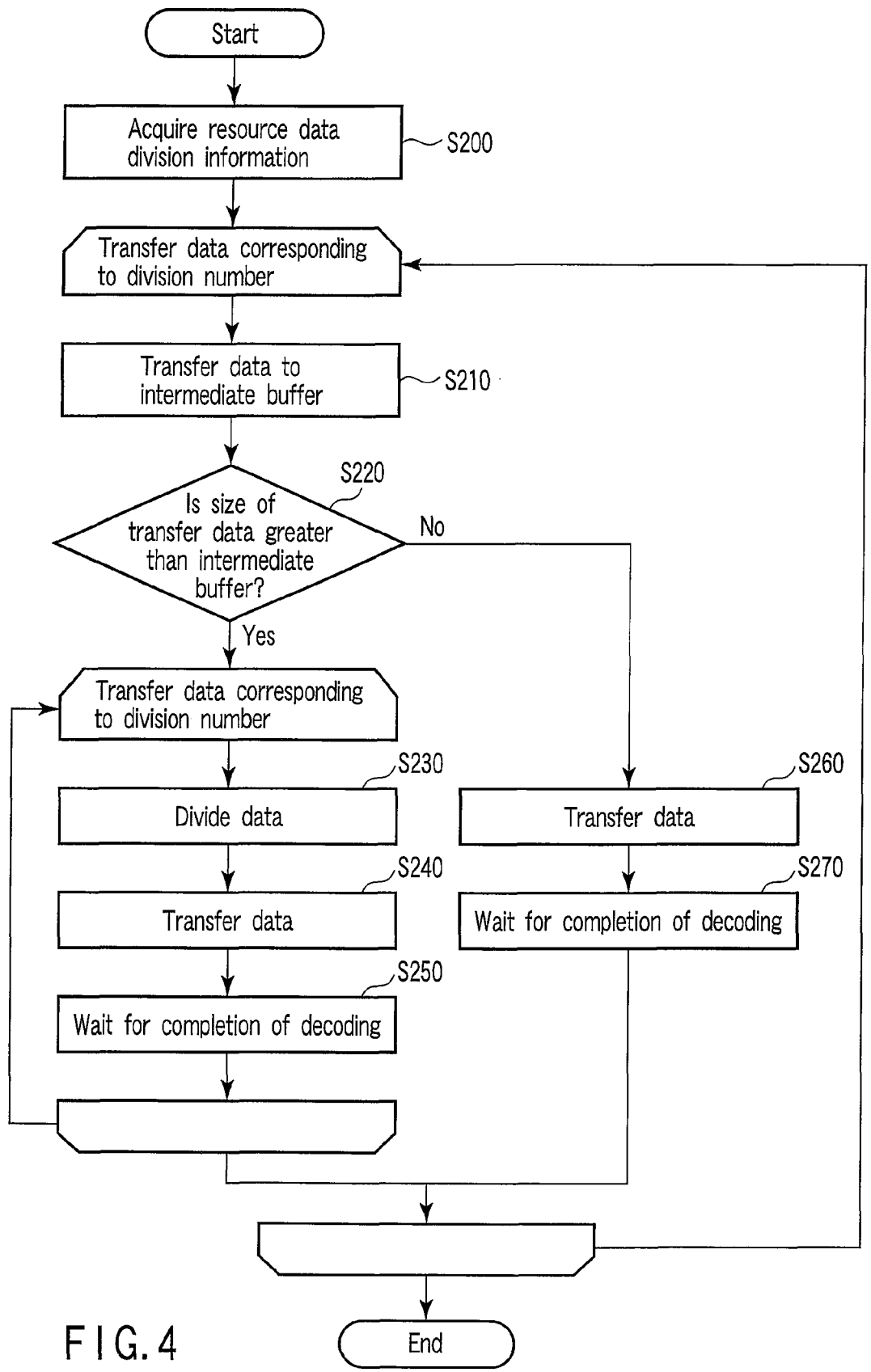
FIG. 4 is an exemplary view for illustrating another example of the information reproducing method for use in the information reproducing apparatus in the embodiment.

As illustrated in a flow chart of FIG. 4, in the information reproducing apparatus according to the present embodiment, in the case where the determination unit B181 determines that the resource data are arranged in physically divided discontinuous areas, the resource data are delivered via the intermediate buffer B140 which is provided between the file cache B120 and the resource decoder B150 and functions as a minimum necessary physically continuous memory area for decoding.

Specifically, in the case where the determination unit B181 determines that the resource data are arranged in the continuous areas in the file cache B120, the switching control unit B191 of the resource display control unit B190 switches the path of the change-over switch B130 to the output terminal B132 side. Accordingly, the resource data which is output from the file cache B120 is input to the resource decoder B150.

In the case where the determination unit B181 determines that the resource data are arranged in the physically divided discontinuous areas in the file cache B120, the switching control unit B191 of the resource display control unit B190 switches the path of the change-over switch B130 to the output terminal B131 side. Accordingly, the resource data which is output from the file cache B120 is once transferred to the intermediate buffer B140 and then input to the resource decoder B150 from the intermediate buffer B140.

Figure 3:
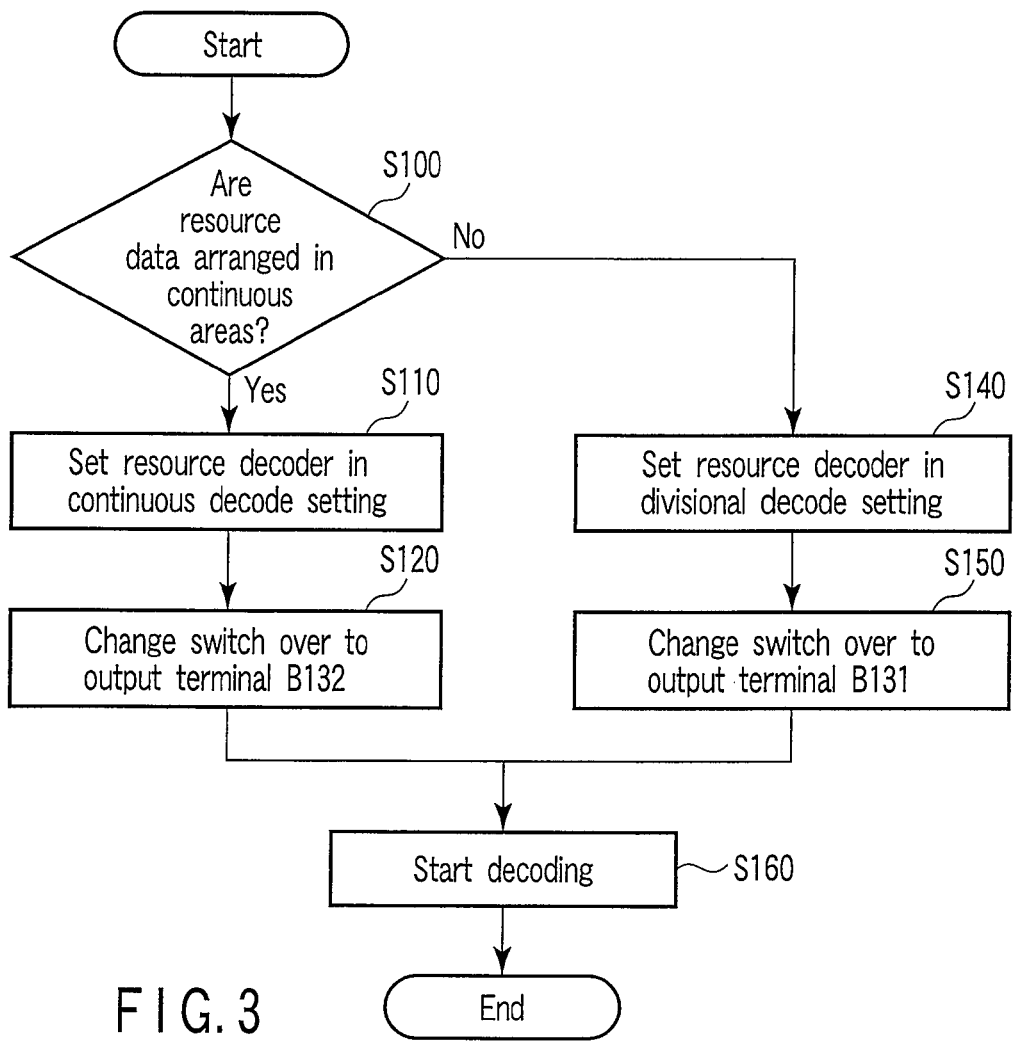
FIG. 3 is an exemplary view for illustrating an example of an information reproducing method for use in the information reproducing apparatus in the embodiment.

In this case, as regards the resource decoder B150, as illustrated in a flow chart of FIG. 3, if it is necessary to change a process between a case in which resource data are arranged in continuous areas and a case in which resource data are arranged in discontinuous areas, the resource display control unit B190 needs to execute setting in the resource decoder B150 (S110, S140).

Specifically, if the determination unit B181 determines that resource data are arranged in continuous areas in the file cache B120 (S100), the decoder setting unit B192 sets the resource decoder B150 in a continuous decoding setting (S110).

In this case, the switching control unit B191 of the resource display control unit B190 switches the path of the change-over switch B130 to the output terminal B132 side (S120). The resource data, which is output from the file cache B120, is input to the resource decoder B150 and the decoding of the resource data is started (S160).

If the determination unit B181 determines that resource data are divided (S100), the resource decoder B150 is set in a divisional decoding setting (S140). In this case, the switching control unit B191 of the resource display control unit B190 switches the path of the change-over switch B130 to the output terminal B131 side (S150). The resource data, which is output from the file cache B120, is input to the resource decoder B150 via the intermediate buffer B140 and the decoding of the resource data is started (S160).

Next, referring to the flow chart of FIG. 4, a description is given of a case in which resource data, which are arranged in divided areas of the file cache B120, are further divided and transferred to the intermediate buffer B140.

In this case, the file cache management unit B180 includes the determination unit B181 which determines whether resource data are arranged in continuous areas or not, and also determines, if it is determined that the resource data are arranged in physically divided discontinuous areas, whether the size of the data, which is to be transferred from the file cache B120 to the intermediate buffer B140, is greater than the capacity of the intermediate buffer B140.

To start with, the resource display control unit B190 acquires resource data division information from the file cache management unit B180 (S200). Since the resource data division information indicates that the resource data are arranged in the divided areas of the file cache B120, the resource display control unit B190 switches the path of the change-over switch B130 to the output terminal B131 side, and transfers the divided resource data to the intermediate buffer B140 (S210)

At this time, if the size of the data to be transferred is not greater than the capacity of the intermediate buffer B140 (S220), the resource display control unit B190 transmits the resource data from the file cache B120 to the intermediate buffer B140 (S260). The resource display control unit B190 stands by until the resource data that is transferred to the intermediate buffer B140 is decoded (S270), and then the resource display control unit B190 transfers the next data.

If the size of the data to be transferred is greater than the capacity of the intermediate buffer B140 (S220), the resource display control unit B190 further divides the data to be transferred (S230), and then transmits the divided resource data to the intermediate buffer B140 (S240).

For example, assume now the case in which the resource decoder B150 can execute divisional decoding of resource data only in units of 2 MB. Also assume the case in which the size of the resource data that is stored in the file cache B120 is 10 MB, the resource data are arranged in ten physically divided areas in the file cache B120 in units of 1 MB, and the size of the intermediate buffer B140 is 2 MB. In this case, if the resource decoder B150 is set in the divisional decoding setting and the change-over switch B130 is switched to the output terminal B132 side, the resource decoder B150 cannot execute a decode process for the resource data.

To cope with this problem in the above-described case, the change-over switch B130 is switched to the output terminal B131 side, and two divided resource data each having a size of 1 MB need to be transferred from the file cache B120 to the intermediate buffer B140, and these two divided resource data, which have a data size of 2 MB in total, need to be supplied to the resource decoder B150. The "further dividing" of divided data, in this context, is a process which needs to be executed because of restrictions by the decoder or by the resource data.

The resource data, which are transferred to the intermediate buffer B140, are output from the intermediate buffer B140 to the resource decoder B150 and are decoded. If the decoding is completed (S250), the next resource data to be transferred are transferred to the intermediate buffer B140.

As has been described above, it is determined whether the resource data, which are loaded in the file cache B120, are arranged in continuous areas or not. If the resource data are arranged in the divided areas, the resource data, which are output from the file cache B120, are once delivered to the intermediate buffer B140 and are made continuous. Then, the continuous data are input to the resource decoder B150. On the other hand, in the case where the resource data are arranged in the continuous areas, the resource data which are arranged in the file cache B120 are directly input to the decoder B150. Thereby, an excess overhead of a direct data transfer process or an excess overhead of decoder control can be prevented from occurring, and the performance of the entire system can be improved.

Specifically, the present embodiment can provide an information reproducing apparatus wherein since the decoding process can be executed at high speed, the process from the beginning to the end of display is quick, and the performance is good.

In the present invention, at the stage when the file cache management unit B180 has secured a memory area in order to arrange resource data in the file cache, the file cache management unit executes management as to whether the resource data are arranged in physically divided memory areas or not. By changing the method of processing the resource data, the performance of the entire system can be improved.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information reproducing apparatus comprising:
a memory which includes a plurality of memory areas in which input data are stored;
a decoder which decodes the data;
an intermediate memory which is disposed between the memory and the decoder and which temporarily stores, in succession, the data that are supplied from the memory and then outputs the data to the decoder;
switching means for switching an output of the memory to one of the decoder and the intermediate memory;
memory management means for managing arrangement information of the data that are stored in the plurality of memory areas;
determination means for determining whether the data that are stored in the memory are arranged in continuous memory areas of the memory; and
switching control means for switching, in a case where the determination means determines that the data are arranged in physically divided memory areas of the plurality of memory areas, the switching means in a manner to input the data output from the memory to the decoder via the intermediate memory, and switching, in a case where the determination means determines that the data are arranged in the continuous areas of the memory, the switching means in a manner to input the data output from the memory to the decoder.

2. The information reproducing apparatus according to claim 1, further comprising a memory management table which is indicative of arrangement information of the plurality of memory areas in which the data are stored,
wherein the determination means is means for determining whether the data are arranged in the physically divided memory areas, on the basis of the arrangement information of the data that are stored in the plurality of memory areas, by referring to the memory management table.

3. The information reproducing apparatus according to claim 2, further comprising decoder setting means for setting the decoder in a divisional decode setting in a case where the determination means has determined that the data are arranged in physically divided memory areas of the plurality of memory areas, and setting the decoder in a continuous decode setting in a case where the determination means has determined that the data are arranged in the continuous areas of the memory.

4. The information reproducing apparatus according to claim 2, further comprising:
   second determination means for determining, in a case where the determination means has determined that the data are arranged in physically divided memory areas of the plurality of memory areas, whether a size of the data that is transferred from the memory is greater than a capacity of the intermediate memory; and
   dividing means for dividing, in a case where the second determination means determines that the size of the data that is transferred from the memory is greater than the capacity of the intermediate memory, the data into a plurality of units each having a predetermined size when the data is transferred from the memory to the intermediate memory.

5. The information reproducing apparatus according to claim 1, further comprising decoder setting means for setting the decoder in a divisional decode setting in a case where the determination means has determined that the data are arranged in physically divided memory areas of the plurality of memory areas, and setting the decoder in a continuous decode setting in a case where the determination means has determined that the data are arranged in the continuous areas of the memory.

6. The information reproducing apparatus according to claim 5, further comprising:
   second determination means for determining, in a case where the determination means has determined that the data are arranged in physically divided memory areas of the plurality of memory areas, whether a size of the data that is transferred from the memory is greater than a capacity of the intermediate memory; and
   dividing means for dividing, in a case where the second determination means determines that the size of the data that is transferred from the memory is greater than the capacity of the intermediate memory, the data into a plurality of units each having a predetermined size when the data is transferred from the memory to the intermediate memory.

7. The information reproducing apparatus according to claim 1, further comprising:
   second determination means for determining, in a case where the determination means has determined that the data are arranged in physically divided memory areas of the plurality of memory areas, whether a size of the data that is transferred from the memory is greater than a capacity of the intermediate memory; and
   dividing means for dividing, in a case where the second determination means determines that the size of the data that is transferred from the memory is greater than the capacity of the intermediate memory, the data into a plurality of units each having a predetermined size when the data is transferred from the memory to the intermediate memory.

8. An information reproducing method for use in an information reproducing apparatus comprising:
   a memory which includes a plurality of memory areas in which input data are stored;
   a decoder which decodes the data;
   an intermediate memory which is disposed between the memory and the decoder and which temporarily stores, in succession, the data that are supplied from the memory and then outputs the data to the decoder;
   switching means for switching an output of the memory to one of the decoder and the intermediate memory; and
   memory management means for managing arrangement information of the data that are stored in the plurality of memory areas, the information reproducing method comprising:
   a determining step of determining whether the data that are stored in the memory are arranged in continuous memory areas of the memory; and
   a switching control step of switching, in a case where it is determined in the determining step that the data are arranged in physically divided memory areas of the plurality of memory areas, the switching means in a manner to input the data output from the memory to the decoder via the intermediate memory, and switching, in a case where it is determined in the determining step that the data are arranged in the continuous areas of the memory, the switching means in a manner to input the data output from the memory to the decoder.

* * * * *